(12) United States Patent
Sugawara

(10) Patent No.: US 6,496,644 B1
(45) Date of Patent: Dec. 17, 2002

(54) OPTICAL COMPONENT HAVING FIBERS WITH PARTITIONED CORES AND PRODUCTION METHOD THEREOF

(75) Inventor: Takeo Sugawara, Hamamatsu (JP)

(73) Assignee: Hamamatsu Photonics K.K., Shizuoka (JP)

(*) Notice: Subject to any disclaimer, the term of this patent is extended or adjusted under 35 U.S.C. 154(b) by 12 days.

(21) Appl. No.: 09/697,078

(22) Filed: Oct. 27, 2000

Related U.S. Application Data

(63) Continuation-in-part of application No. PCT/JP99/01446, filed on Mar. 23, 1999.

(30) Foreign Application Priority Data

Apr. 27, 1998 (JP) .......................................... 10-117491

(51) Int. Cl.$^7$ ................................................ G02B 6/10
(52) U.S. Cl. ...................................... 385/146; 385/116
(58) Field of Search .......................... 385/146, 115–128

(56) References Cited

U.S. PATENT DOCUMENTS 2,825,260 A * 3/1958 O'Brien ...................... 385/116

FOREIGN PATENT DOCUMENTS

| JP | 41-18867 | 10/1966 |
| JP | 50-35628 | 8/1967 |
| JP | 48-59849 | 8/1973 |

* cited by examiner

*Primary Examiner*—Brian Sircus
*Assistant Examiner*—Son V. Nguyen
(74) *Attorney, Agent, or Firm*—Morgan, Lewis & Bockius LLP

(57) ABSTRACT

An optical component (10), formed with a plurality of optical fibers arranged parallel with each other, has an incident surface (10a) obliquely cut with respect to the fiber axis, and an output surface (10b) perpendicularly cut with respect to the fiber axis. The core (12) of each optical fiber with a square cross-sectional shape is divided equally into two areas (12a) and (12b) via a flat plate-like clad part (14) lying on the central axis of the core (12). Moreover, the optical fibers are arranged such that the dividing directions (t direction in FIG. 1B) of the divided cores (12) are irregular per each optical fiber. Furthermore, the periphery of each core (12) is covered with a clad (16).

5 Claims, 19 Drawing Sheets

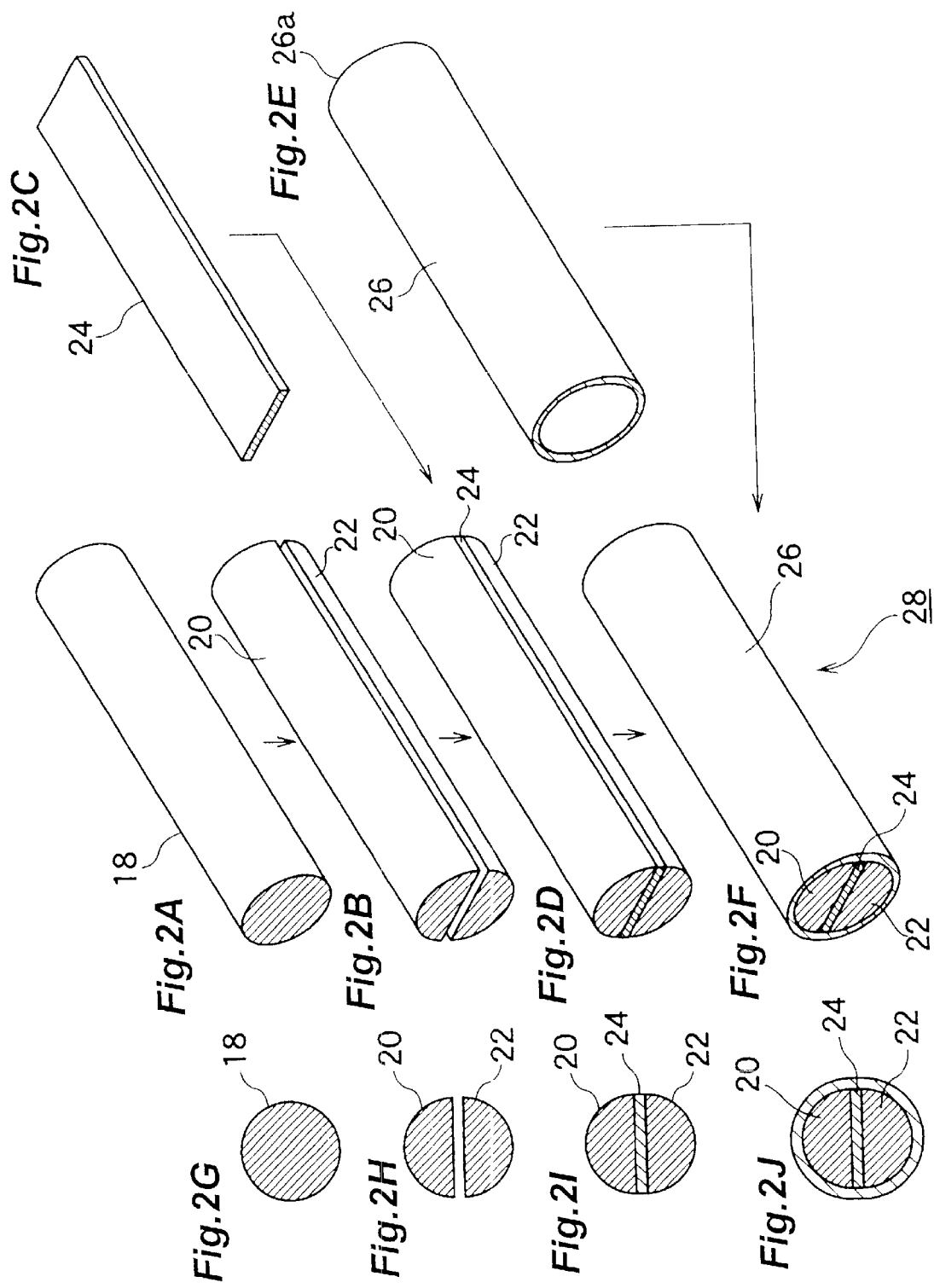

*Fig.6A*
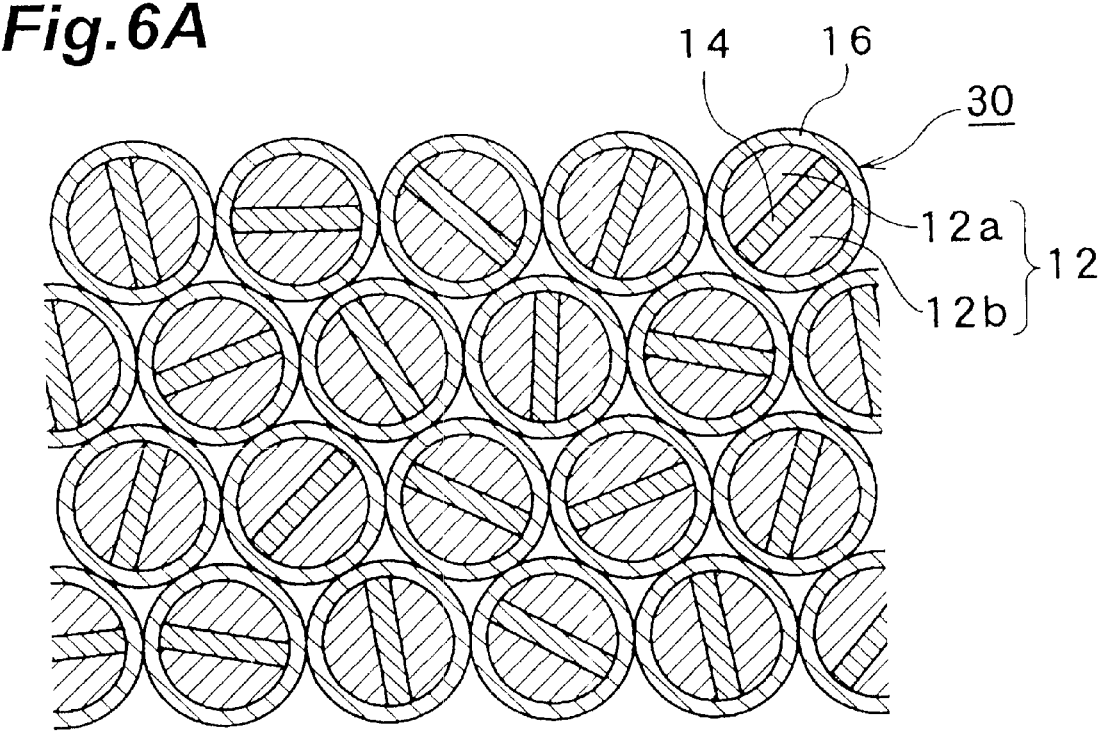
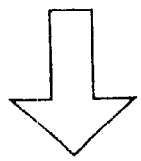
*Fig.6B*
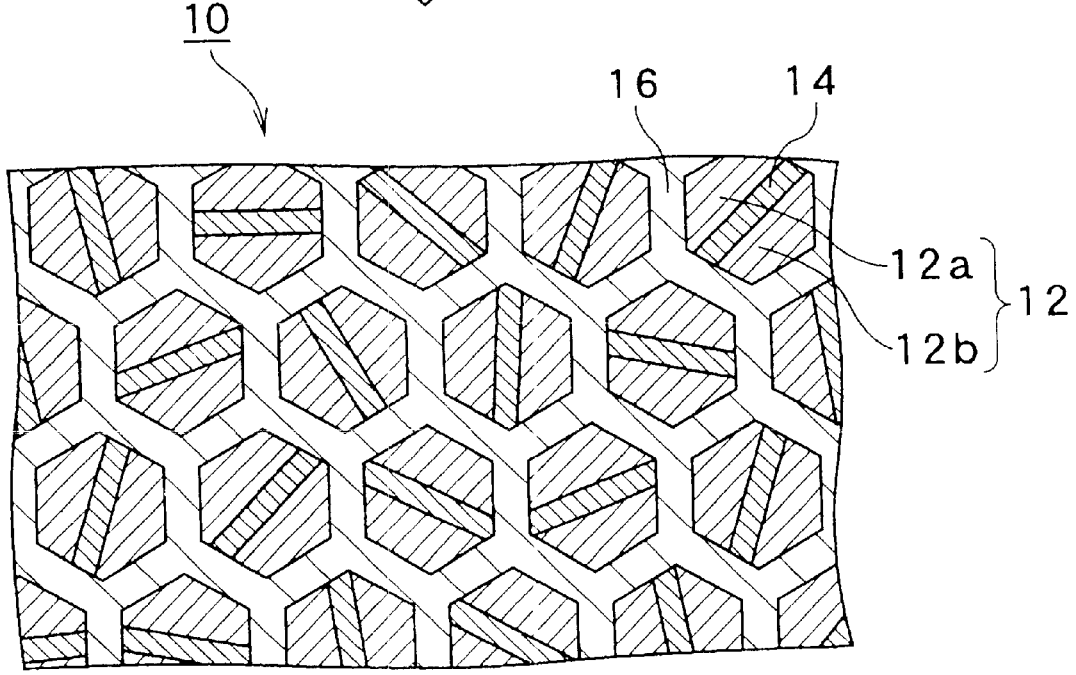

Fig.9A
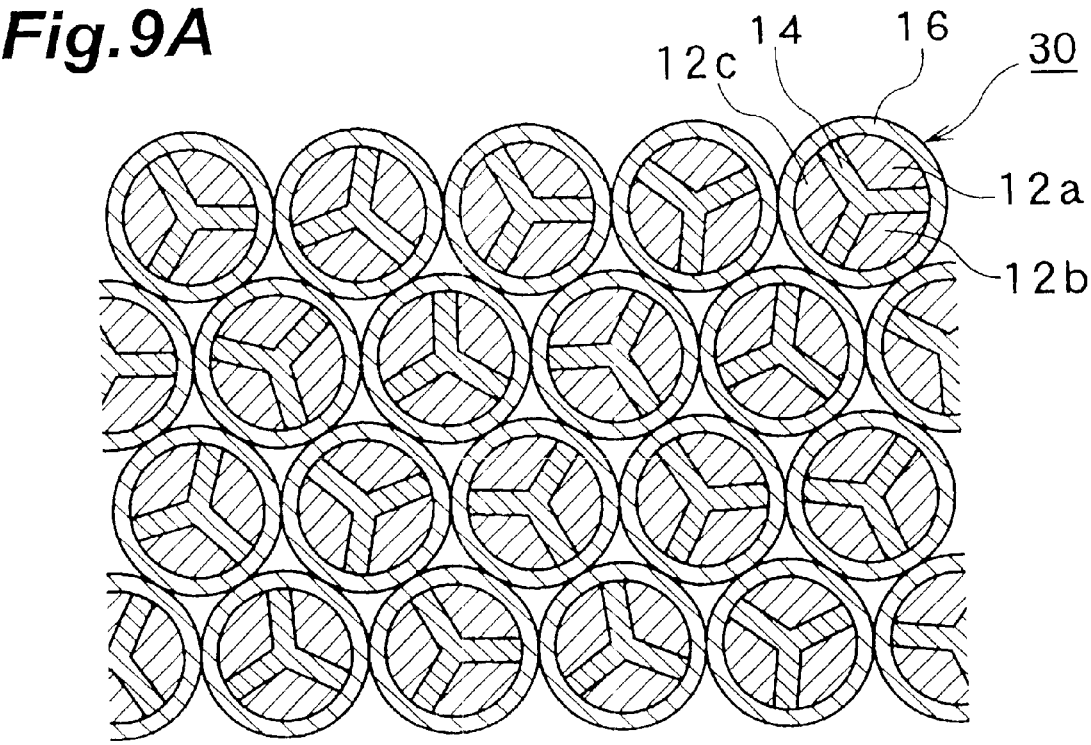
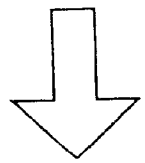
Fig.9B
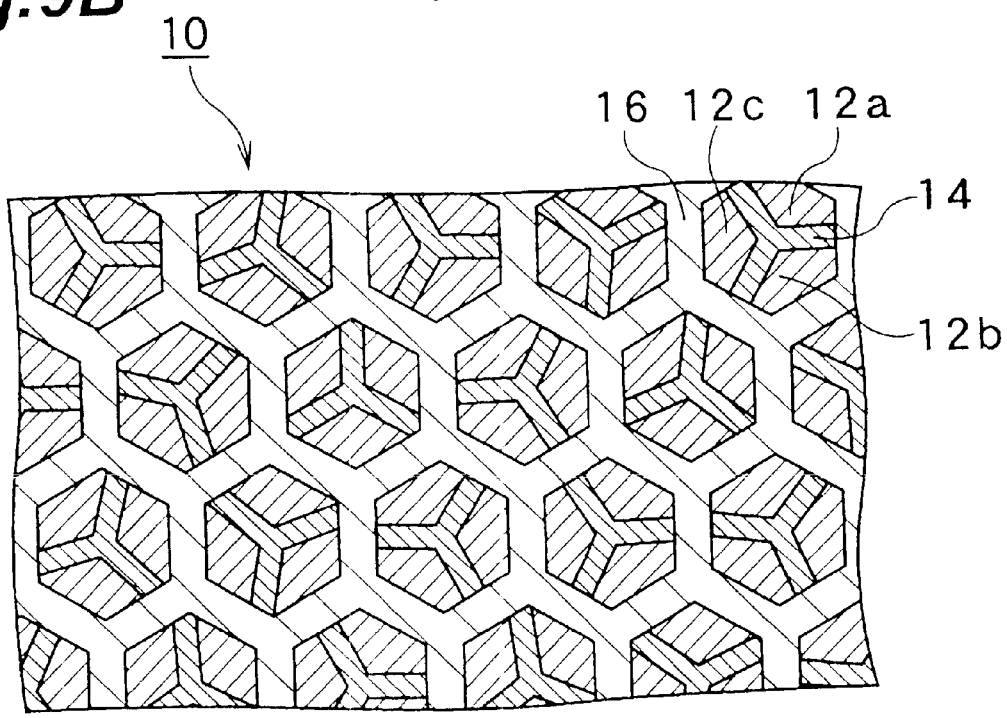

Fig.11A
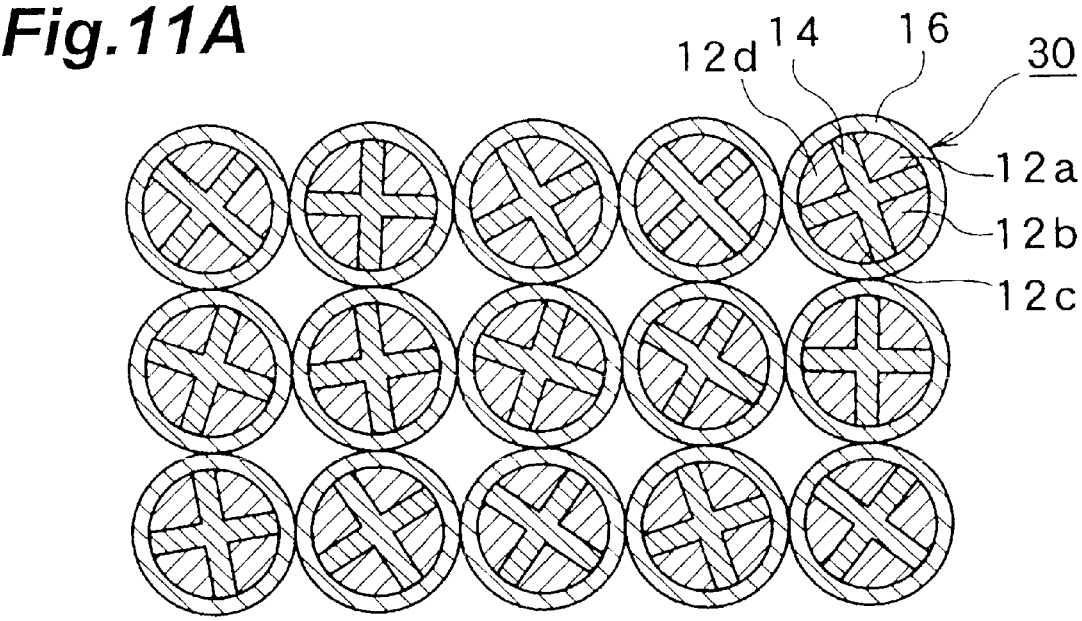
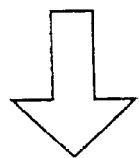
Fig.11B
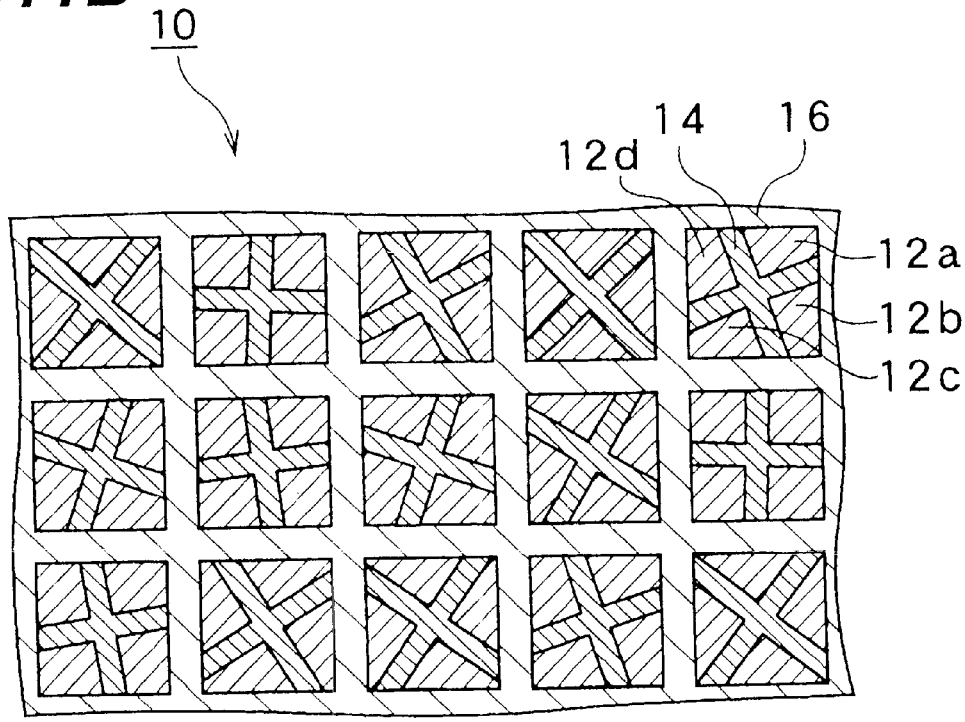

Fig.15A
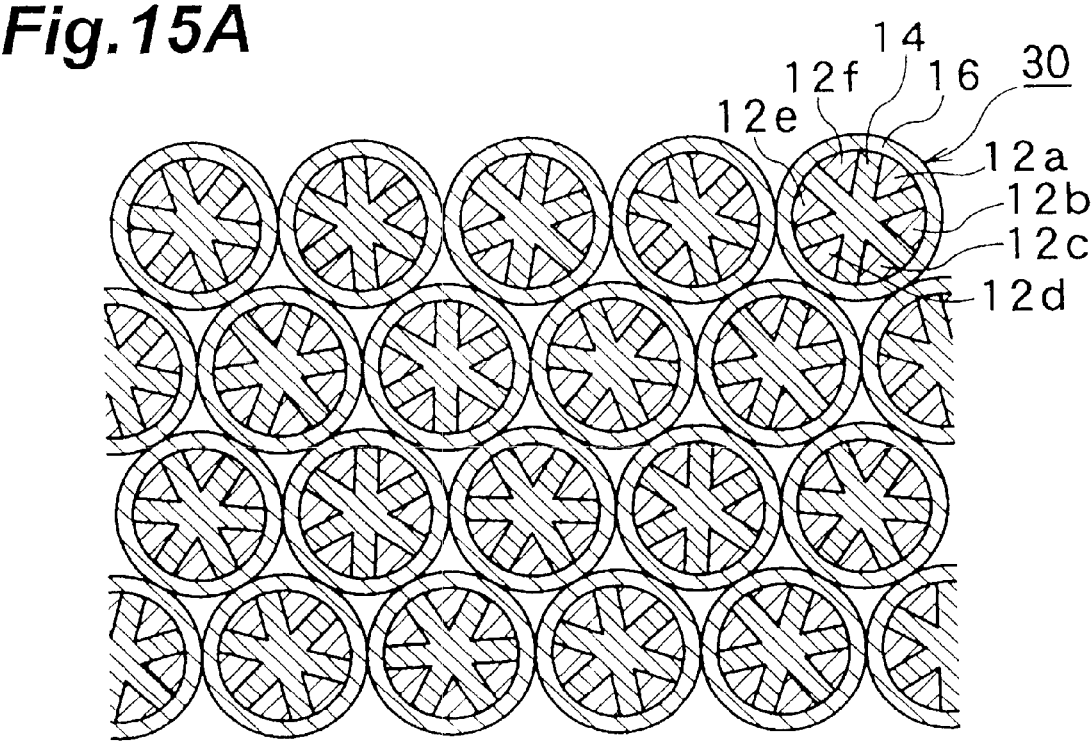
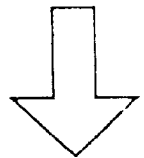
Fig.15B
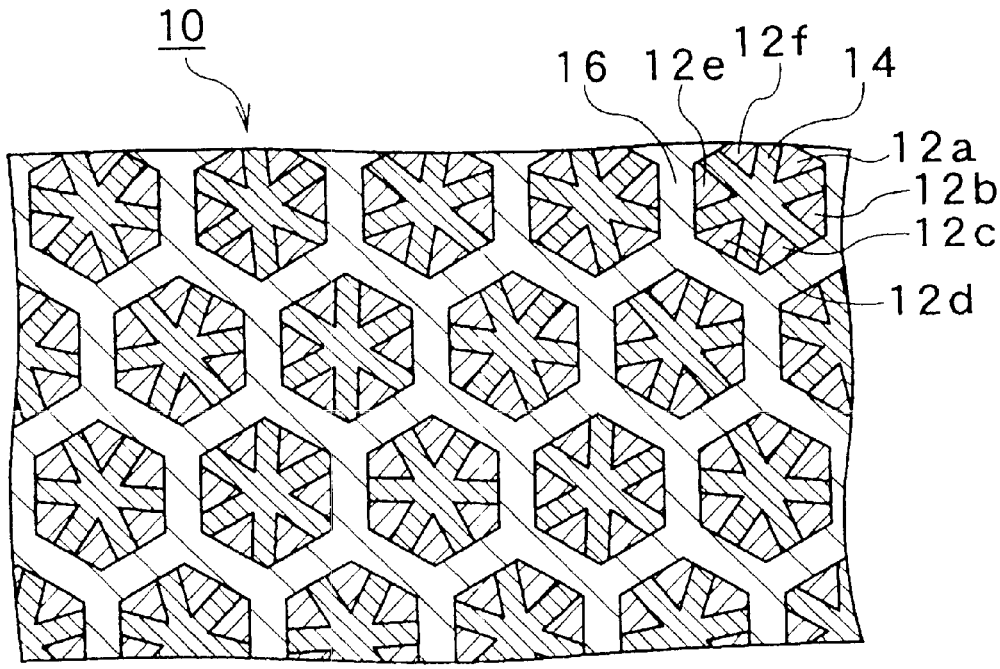

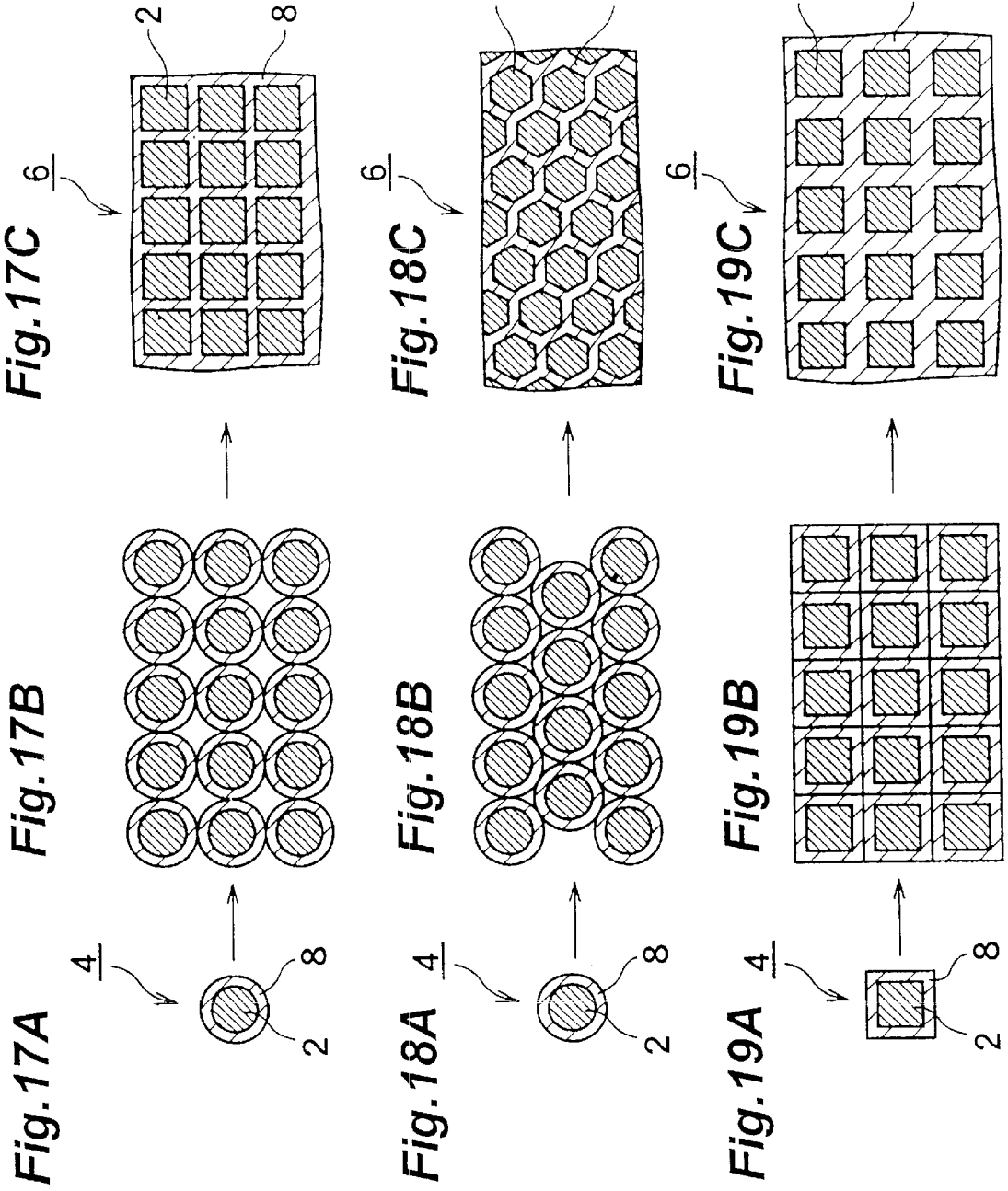

OPTICAL COMPONENT HAVING FIBERS WITH PARTITIONED CORES AND PRODUCTION METHOD THEREOF

RELATED APPLICATION

This is a continuation-in part application of application Ser. No. PCT/JP99/01446 filed on Mar. 23, 1999, now pending.

BACKGROUND OF THE INVENTION

1. Field of Invention

The present invention relates to an optical component comprising a plurality of optical fibers arranged, and a production method thereof.

2. Related Background Art

As an optical component for transmitting an optical image, an optical component formed by arranging a plurality of optical fibers is widely known. The optical component comprises an incident surface and an output surface with the core and the clad of each optical fiber exposed so as to allow transmission of the optical image incident on the incident surface to the output surface.

Moreover, since the optical component has various advantages, such as a high transmission efficiency, and capability of achieving a small size of an optical system compared with a lens, it is utilized in various fields represented by a fingerprint detecting device.

SUMMARY OF THE INVENTION

Production of the optical component is executed, in general, by arranging and tying up a plurality of optical fibers having a round or square cross-section in a bundle for integral shaping. Therefore, according to the pressure in the integral shaping, the cross-section of the core of the optical fibers comprising the optical component becomes a polygon having subtenses parallel with each other, such as a square, and a hexagon so that the below-mentioned problem is generated.

That is, a light incident on the incident surface with a specific incident angle repeats reflection on the opposite surfaces parallel with each other so as to be outputted from the output surface with a specific output angle. As a result, a pattern having an intensity only in the specific output angle is formed in the output image outputted from the output surface so that the pattern becomes a noise so as to deteriorate the resolution of the optical component.

Accordingly, in order to solve the problem, an object of the present invention is to provide an optical component having a high resolution by preventing generation of the pattern noise and production method of the optical component.

In order to solve the above-mentioned problem, an optical component according to the present invention comprises a plurality of arranged optical fibers including a core and a clad formed around the core, characterized in that the core of each optical fiber having a substantially square cross-sectional shape, is divided into a plurality of areas via a partition part made from a material with a refractive index smaller than that of the core, and at least one of the optical fibers arranged adjacent with each other has the dividing direction of the divided core different from that of the other optical fibers.

Since the core of each optical fiber is divided into a plurality of areas via a partition part made from a material having a refractive index smaller than that of the core, a light incident on the core of each optical fiber with a specific incident angle proceeds in the core while repeating reflection not only by the surrounding clad but also by the partition part. Moreover, since at least one of the optical fibers arranged adjacent with each other has the dividing direction of the divided core different from that of the other optical fibers, even though the cross-sectional shape of the core is a substantial square having subtenses parallel with each other, formation of a pattern having an intensity only at a specific incident angle by repeating reflection of a light proceeding in the cores in all the optical fibers comprising the optical component only in a specific direction can be prevented. As a result, a pattern noise can be prevented so that an output image with a high resolution can be obtained.

Furthermore, a production method of an optical component according to the present invention comprises an arrangement step of arranging a plurality of optical fibers including a core and a clad formed around the core, and a shaping step of integrally shaping the plurality of the optical fibers arranged in the arrangement step by a heating and pressuring treatment, characterized in that the core of each optical fiber is divided into a plurality of areas via a partition part made from a material with a refractive index smaller than that of the core, at least one of the optical fibers arranged adjacent with each other is arranged with the dividing direction of the divided core different from that of the other optical fibers in the arrangement step, and the viscosity of the core under the temperature of the heating and pressuring treatment is smaller than the viscosity of the clad in the shaping step. By the use of the production method, the optical component can be produced easily.

The present invention will be more fully understood from the detailed description given hereinafter and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 2A to 2F are production step diagrams for an optical fiber comprising the optical component.

FIGS. 2G to 2J are cross-sectional views of a base material, or the like, produced in each step.

FIGS. 6A, 6B are production step diagrams for the optical component according to the embodiment of the present invention.

FIGS. 9A, 9B are production step diagrams for the optical component according to the embodiment of the present invention.

FIGS. 11A, 11B are production step diagrams for the optical component according to the embodiment of the present invention.

FIGS. 15A, 15B are production step diagrams for the optical component according to the embodiment of the present invention.

FIGS. 17A to 17C are production step diagrams for an optical component according to a conventional technique.

FIGS. 18A to 18C are production step diagrams for the optical component according to the conventional technique.

FIGS. 19A to 19C are production step diagrams for the optical component according to the conventional technique.

DESCRIPTION OF THE PREFERRED EMBODIMENTS

Figure 1A:
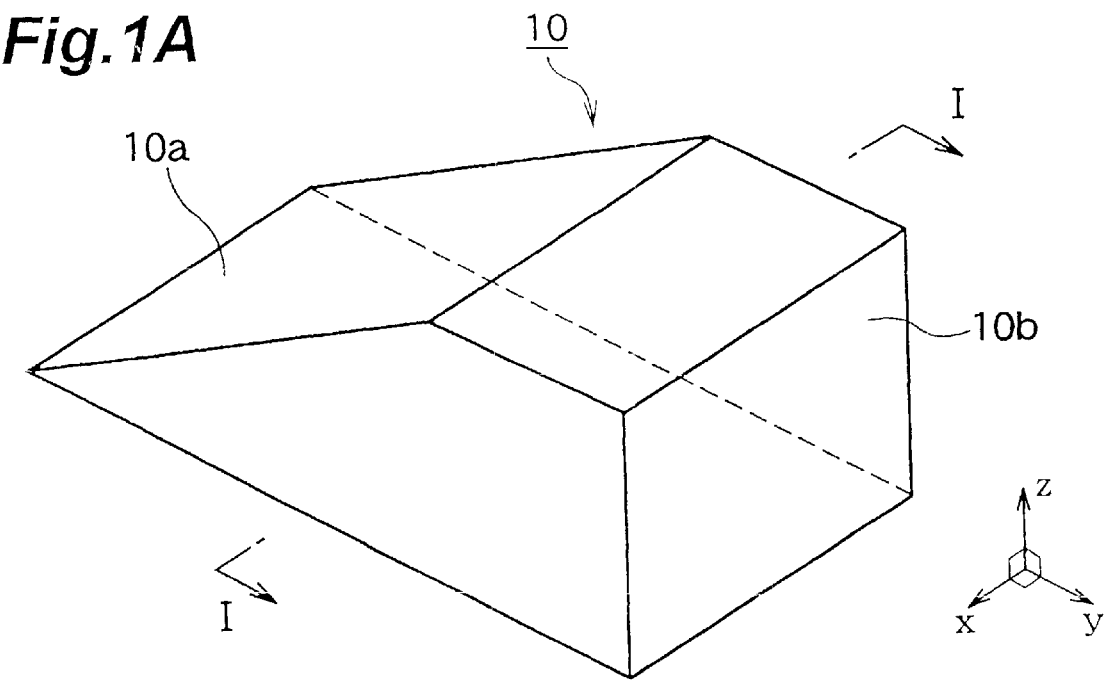
FIG. 1A is a perspective view of an optical component according to an embodiment of the present invention.

An optical component according to an embodiment of the present invention will be explained with reference to the drawings. First, the configuration of the optical component according to this embodiment will be explained. FIG. 1A is a perspective view of the optical component according to this embodiment, and FIG. 1B is an enlarged cross-sectional view taken along the line I—I (straight line parallel with the x-axis) in FIG. 1A.

The optical component 10 is formed with a plurality of optical fibers having a square cross-sectional shape of the core, arranged parallel with each other. Each optical fiber has the fiber axis disposed parallel with the y-axis in FIG. 1A. The optical component 10 has an incident surface 10a obliquely cut with respect to the fiber axis, and an output surface 10b perpendicularly cut with respect to the fiber axis so that an input pattern incident on the incident surface 10a can be reduced and outputted from the output surface 10b.

Figure 1B:
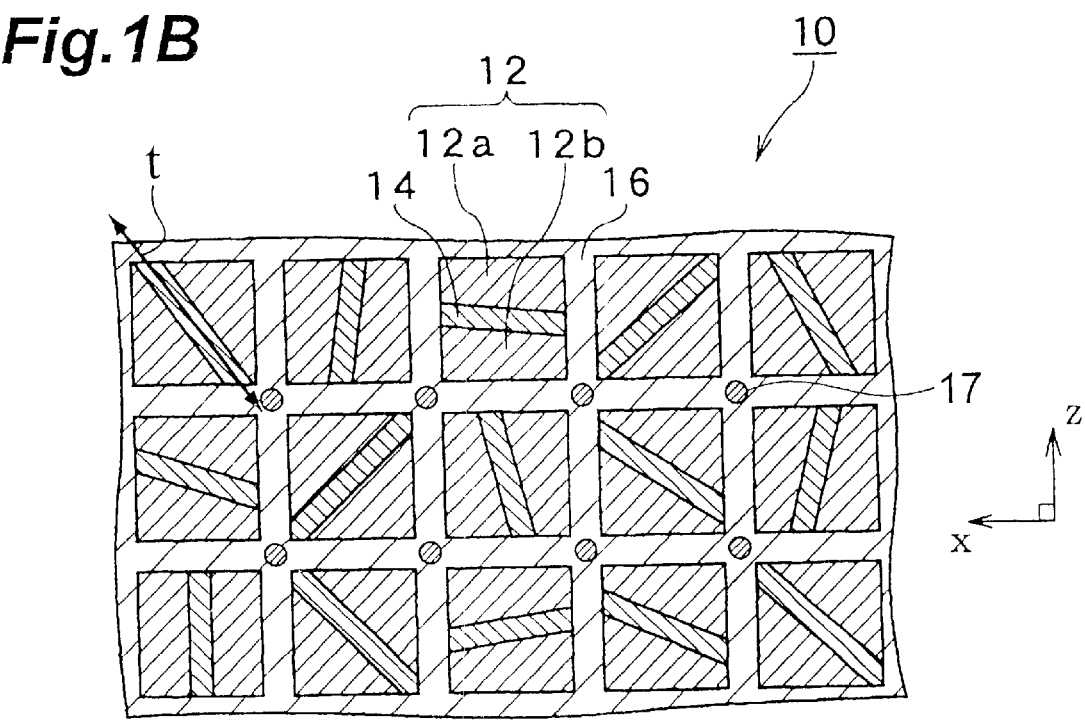
FIG. 1B is an enlarged cross-sectional view taken along the line I—I in FIG. 1A.

As shown in FIG. 1B, the cross-section of the optical component 10 has a structure with the optical fibers having the core 12 with a square cross-section arranged. Here, the core 12 of each optical fiber is divided equally into two areas 12a and 12b via a flat plate-like clad part 14 (partition part) lying on the central axis of the core 12. Moreover, at least one of the optical fibers arranged adjacent with each other has the dividing direction (t direction in FIG. 1B) of the divided core 12 different from that of the other optical fibers. More specifically speaking, the dividing directions (t direction in FIG. 1B) of the divided cores 12 are arranged irregularly per each optical fiber. Furthermore, the periphery of each core 12 is covered with a clad 16. Here, the clad 16 of each optical fiber is integrated by a heating and pressuring treatment so as to fill the gap among the adjacent optical fibers.

The core 12 of each optical fiber is made from, for example, a Ba-La based glass having a 1.82 refractive index, and the clad part 14 and the clad 16 are made from, for example, a borosilicate glass having a 1.495 refractive index. Therefore, the refractive index of the clad part 14 is smaller than the refractive index of the core 12. Moreover, one side of the core 12 is about 10 $\mu$m, and the clad part 14 and the clad 16 has about 1 $\mu$m thickness, which is ⅓ or more with respect to the wavelength (550 nm) ordinarily used in the optical component 10.

Furthermore, a light absorbing member 17 elongating in the axial direction of each optical fiber is inserted in the part of the clad 16. By inserting the light absorbing member 17 in the part of the clad 16, a stray light leaked in the clad 16, or a light entered into the optical component 10 from the side surface (surface other than the incident surface and the output surface) can be eliminated effectively so that the resolution of an output pattern can be improved.

Next, a production method of an optical component according to this embodiment will be explained. FIGS. 2A to 2F are production step diagrams for an optical fiber comprising the optical component 10, and FIGS. 2G to 2J are cross-sectional view of a base material, or the like, produced in each step.

For producing the optical fiber comprising the optical component 10, first, similar to the production of an ordinary optical fiber, a core base material 18 having a columnar shape is produced (FIG. 2A, FIG. 2G). The core base material 18 is made from, for example, a Ba-La based glass having a 1.82 refractive index, with the side surface thereof polished by a ceria polish method, or the like.

Next, the core base material 18 produced in the above-mentioned step is cut vertically (perpendicular direction with respect to the bottom surface of the columnar shape) by a diamond cutter, or the like so as to be divided into two core base materials 20 and 22 having a semi-columnar shape (FIG. 2B, FIG. 2H). At the time, the cut surface is polished by a ceria polish method, or the like.

Next, a plate-like clad base material 24 as shown in FIG. 2C is interposed between the two core base materials 20 and 22 (FIG. 2D, FIG. 2I). Here, the clad base material 24 is made from, for example, a borosilicate glass having a 1.495 refractive index.

Next, the product of the above-mentioned step with the plate-like clad base material 24 interposed between the two core base materials 20 and 22 is put in a clad base material 26 having a pipe shape as shown in FIG. 2E so as to produce a base material 28 for the optical fiber production (FIG. 2F, FIG. 2J). Here, similar to the above-mentioned clad base material 24, the clad base material 26 is made from, for example, a borosilicate glass having a 1.495 refractive index. One bottom part 26a of the clad base material 26 is sealed by a melting method with a burner, or the like.

Figure 3:
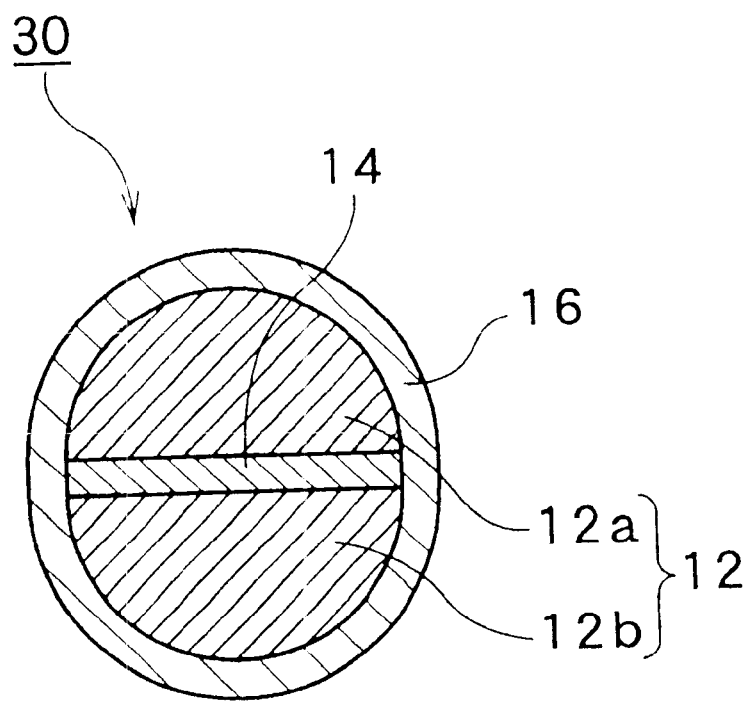
FIG. 3 is an enlarged cross-sectional view of the optical fiber used in the production of the optical component.

Thereafter, by drawing the base material 28, an optical fiber is produced. An enlarged cross-section of the optical fiber produced according to this method is shown in FIG. 3. The optical fiber 30 has a structure with the core 12 having a round cross-section equally divided into the two areas 12a and 12b having a semi-circular cross-section via the flat plate-like clad part 14 lying on the central axis of the core 12, and the periphery thereof covered with the clad 16.

Figure 4A:
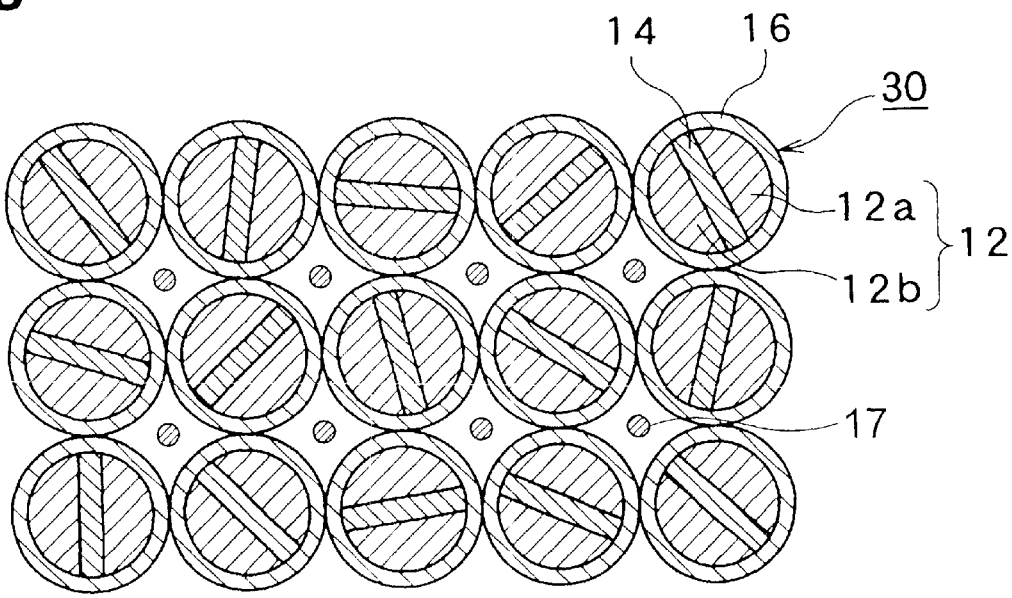
FIGS. 4A, 4B are production step diagrams for the optical component according to the embodiment of the present invention.

As shown in FIG. 4A, a plurality of the optical fibers 30 produced by the above-mentioned step are arranged in the quadrilateral arrangement parallel with each other with the bar-like light absorbing members 17 optionally inserted such that the dividing direction of the cores 12 can be irregular par each optical fiber so as to be shaped integrally by a heating and pressuring treatment for producing the optical component 10. Here, in order to improve the resolution of the optical component 10, it is also possible to further draw the plurality of the optical fibers arranged parallel (multi-fiber) and arrange the same parallel for the integral shaping, or to repeat the step of the drawing and the step of the parallel arrangement for a plurality of times (multi-multi-fiber) for integral shaping so as to produce the optical component 10. As to the concrete shape of the optical fiber, in consideration of about 10 μm diameter of the core 12, and a 550 nm wavelength to be used, the thickness of the clad part 14 is about 1 μm, and the thickness of the clad 16 is about 0.5 μm.

Figure 4B:
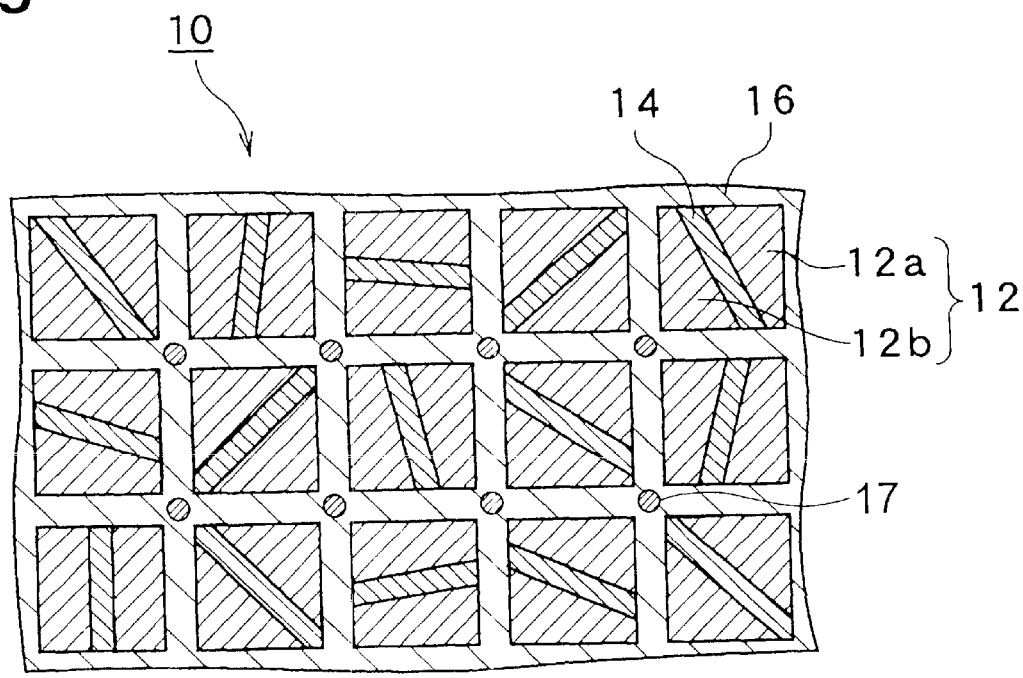
Figure 5:
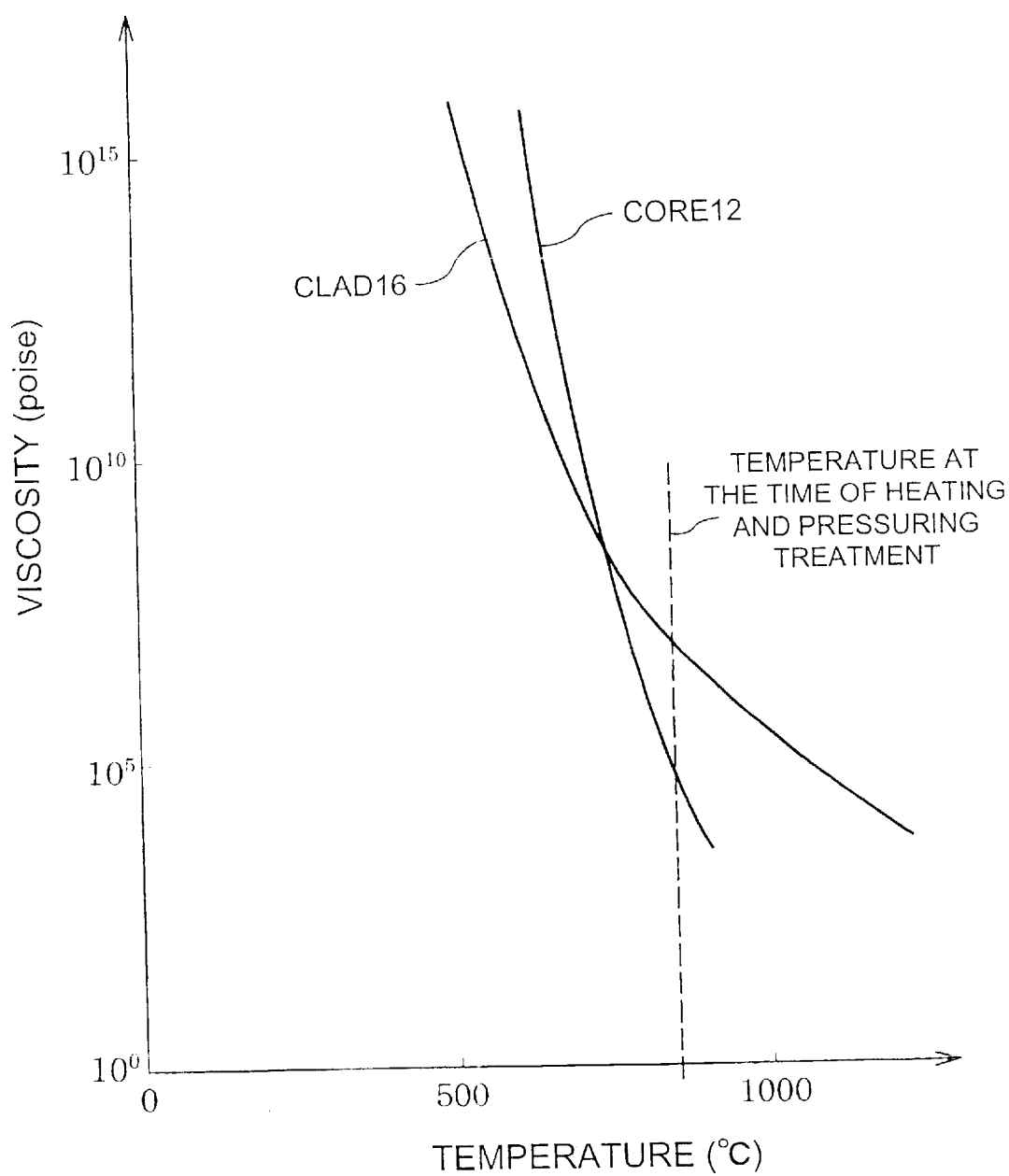
FIG. 5 is a graph showing the relationship between the surrounding temperature and the viscosity of a core and a clad.

As shown in FIG. 5, since the viscosity of the Ba-La based glass as the material comprising the core 12 is smaller than the viscosity of the borosilicate glass as the material comprising the clad 16 under the temperature (about 850° C.) of the heating and pressuring treatment in the optical component 10 produced by the above-mentioned production method, the shape of the core 12 is deformed at the time of the heating and pressuring treatment so that the core 12 obtains a square cross-sectional shape as shown in FIG. 4B.

Next, the effect of the optical component according to this embodiment will be explained. Here, first, the problem of the optical component according to the conventional technique will be pointed out. An optical component according to the conventional technique is produced by, in general, arranging and tying up a plurality of optical fibers having a round or square cross-section parallel with each other in a bundle for integral shaping. Moreover, in order to improve the resolution of the optical component, an optical component can be produced also by arranging parallel and tying up the tied up optical fiber group further drawn (multi-fiber) for integral shaping, or by integral shaping of those after repetition of the drawing step and the tying up step (multi-multi-fiber).

Changes of the cross-sectional shape of the core of each optical fiber in production of the optical component according to the above-mentioned production method are shown in FIGS. 17A to 17C, 18A to 18C, and 19A to 19C. FIGS. 17A to 17C show the change of the cross-sectional shape of the cores 2 in the case the optical component 6 is formed by arranging the optical fibers 4 with the cores 2 having a round cross-section arranged in the quadrilateral arrangement. In the case the optical component 6 is formed by arranging the cores 2 having a round cross-section arranged in the quadrilateral arrangement, as shown in FIGS. 17A to 17C, the cross-section of the core 2 of each optical fiber 4 is deformed substantially to a square according to the heating and pressuring treatment at the time of integral shaping after typing up the optical fibers 4.

Here, the degree of the deformation depends on the hardness of the cores 2 and the clads 8 of the optical fibers 4 under the temperature of the heating and pressuring treatment. In the case the cores 2 are extremely harder than the clads 8, the cross-section of the cores 2 can be maintained in a round shape, but in order to avoid the contact of the adjacent cores 2 with each other, it is difficult to have the cores 2 extremely harder than the clads 8 in the practical use.

FIGS. 18A to 18C show the change of the cross-sectional shape of the cores 2 in the case the optical component 6 is formed by arranging the optical fibers 4 with the cores 2 having a round cross-section arranged in the hexagonal arrangement. In this case, the cross-section of the core 2 of each optical fiber 4 is deformed substantially to a hexagon according to the heating and pressuring treatment at the time of integral shaping after typing up the optical fibers 4. Moreover, FIGS. 19A to 19C show the change of the cross-sectional shape of the cores 2 in the case the optical component 6 is formed by arranging the optical fibers 4 with the cores 2 having a square cross-section arranged in the quadrilateral arrangement. In this case, since the gap among the adjacent clads 8 at the time of arranging the optical fibers 4 is eliminated, the cross-section of the core 2 is kept square after the heating and pressuring treatment at the time of integral shaping after typing up the optical fibers 4.

Figure 20A:
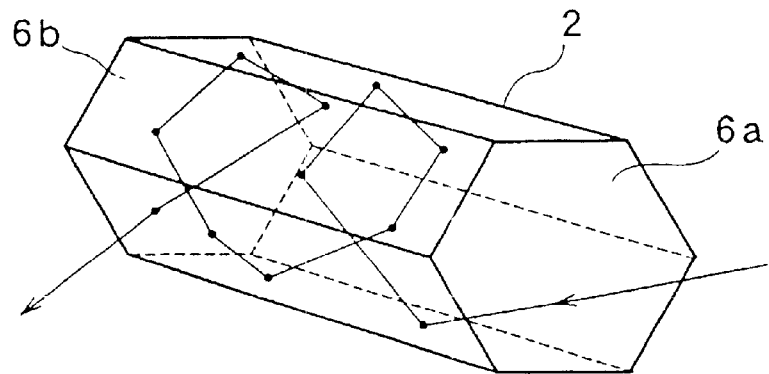
FIGS. 20A to 20C are diagrams showing the state of the progress of a light in a core of an optical fiber comprising the optical component according to the conventional technique.
Figure 20B:
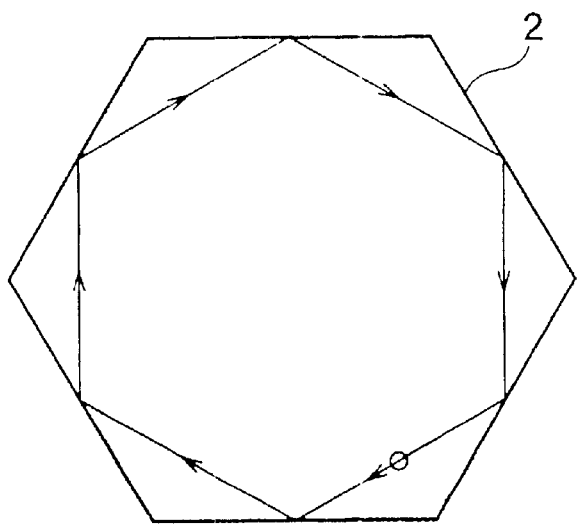
Figure 20C:
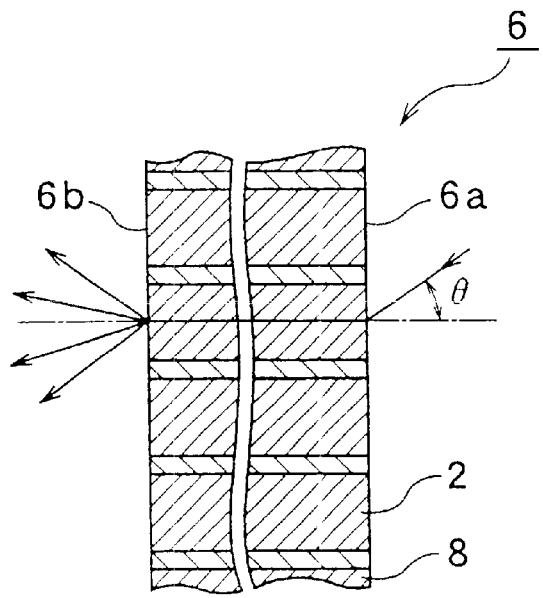
Figure 21A:
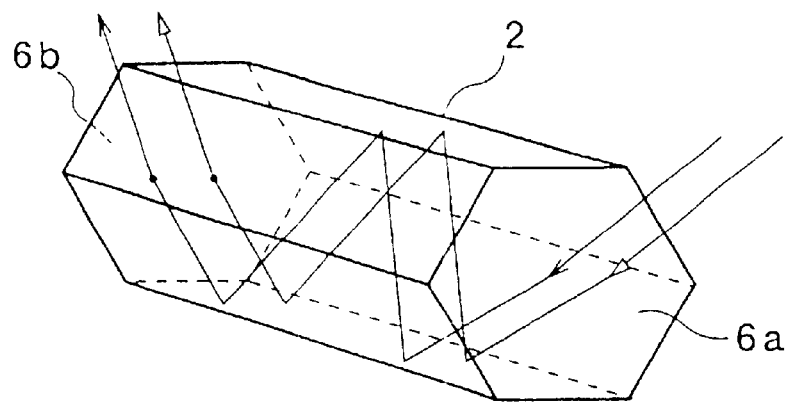
FIGS. 21A to 21C are diagrams showing the state of the progress of a light in the core of the optical fiber comprising the optical component according to the conventional technique.
Figure 21B:
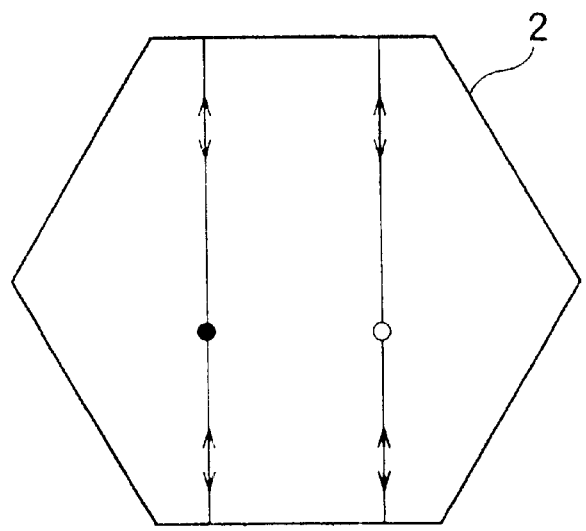
Figure 21C:
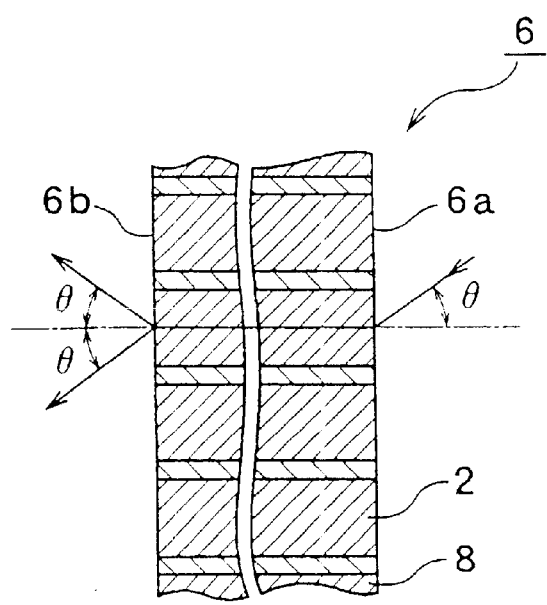

Since the optical components 6 produced as mentioned above have a pentagonal cross-section of the core 2 of each optical fiber 4 having subtenses parallel with each other, such as a square, and a hexagon, the below-mentioned problem is generated. That is, the progress of a light incident on the incident surface of the optical component 6 in the core 2 can either be the spiral progress as shown in FIGS. 20A to 20C or the band-like progress as shown in FIGS. 21A to 21C. Here, the white round mark and the black round mark in FIGS. 20A to 20C and FIGS. 21A to 21C show the light incident position.

FIG. 20A shows the state of the progress of a light incident on the incident surface 6a (incident surface of the core 2) of the optical component 6 in the core 2, and FIG. 20B is a projection diagram of the track of the progress of the light on a plane parallel with the incident surface 6a. As shown in FIGS. 20A and 20B, a light incident on the incident surface 6a of the optical component 6 with a random incident angle (excluding a specific incident angle to be explained with reference to FIGS. 21A to 21C) proceeds spirally in the core 2. As a result, as shown in FIG. 20C, in the case a light is incident on the incident surface 6a of the optical component 6 with a constant incident angle θ, depending on the difference of the incident position, it is outputted from the output surface 6b of the optical component 6 with various output angles.

On one hand, as shown in FIGS. 21A and 21B, light which has been incident on the incident surface 6a of the optical component 6 at a specific incident angle (such an incident angle that light is reflected/progressed only by the parallel opposed surfaces of the core 2) proceeds in a band manner within the core 2. As a result, as shown in FIG. 21C, when light has been incident on the incident surface 6a of the optical component 6 at a constant angle θ, it is output from the output surface 6b of the optical component 6 also with the output angle θ regardless of the difference in incident position. Therefore, a pattern having an intensity only at a specific incident angle is formed in an output image outputted form the output surface 6b of the optical component 6 so that the pattern becomes a noise deteriorating the resolution of the optical component 6. In particular, since an optical component produced by integral shaping of multi-fibers (multi-multi-fiber) has different degrees of the core 2 deformation at the center part and the rim part of the multi-fibers, a pattern noise is generated according to the cross-sectional shapes of the multi-fibers, derived from the difference of the deformation degrees so that the resolution of the optical component 6 is deteriorated remarkably.

In contrast, the case of the optical component 10 according to this embodiment will be considered. The optical component 10 has the core 12 of each optical fiber comprising the optical component 10 divided equally into a plurality of areas 12a and 12b via a flat plate-like clad part 14 lying on the central axis of the core 12. Therefore, a light incident on the core 12 of each optical fiber with a specific incident angle proceeds in the core while repeating reflection not only by the surrounding clad 16 but also by the clad part 14. Thereby, even though the cross-sectional shape of the core 12 is a square having subtenses parallel with each other, unless the clad part 14 is parallel with the interface between the core 12 and the clad 16, the light incident on the incident surface 10a cannot proceeds band-like in the core 12. Here, since the dividing directions of the divided cores 12 in the optical component 10 are arranged irregularly per each optical fiber, even in the case the clad part 14 is parallel with the interface between the core 12 and the clad 16 in a part of the optical fibers comprising the optical component 10, the optical fibers having the clad part 14 not parallel with the interface between the core 12 and the clad part 16 exist at the same time so that formation of an output pattern having an intensity only at a specific output angle by repeating reflection of a light proceeding in the cores 12 in the optical fibers comprising the optical component 10 only in a specific direction can be prevented.

Next, effects of the optical component according to the present embodiment will be explained. Since the optical component 10 has the core 12 of each optical fiber comprising the optical component 10 divided equally into a plurality of areas 12a and 12b via the flat plate-like clad part 14 and the dividing directions of the divided cores 12 in the optical component 10 are arranged irregularly per each optical fiber, formation of an output pattern having an intensity only at a specific output angle by repeating reflection of all of the light proceeding in the cores 12 in the optical fibers comprising the optical component 10 only in a specific direction can be prevented. As a result, a pattern noise can be prevented so that an output image with a high resolution can be obtained from the output surface 10b of the optical component 10.

Furthermore, since the core 12 of each optical fiber is divided equally, a homogeneous output image can be obtained by the optical component as a whole.

Although the optical fibers 30 (or multi-fiber, multi-multi-fiber) are arranged in the quadrilateral dense arrangement for the integral shaping at the time of the integral shaping by the heating and pressuring treatment of a plurality of optical fibers 30 in the above-mentioned embodiment, the integral shaping can be executed with the optical fibers 30 arranged in the hexagonal dense arrangement as shown in FIG. 6A. In this case, the shape of the cores 12 is deformed at the time of the heating and pressuring treatment so that the cross-section of the optical component 10 becomes as shown in FIG. 6B. That is, the core 12 of each optical fiber has a regular hexagonal cross-sectional shape as well as it is divided equally into the two areas 12a and 12b via the flat plate-like clad part 14 lying on the central axis of the core, with the optical fibers arranged such that the dividing directions of the divided cores 12 are irregular per each optical fiber. In order to improve the resolution of an output pattern, it is preferable to provide a light absorbing member 17 inside the clad 16, but it is not prerequisite.

Figure 7:
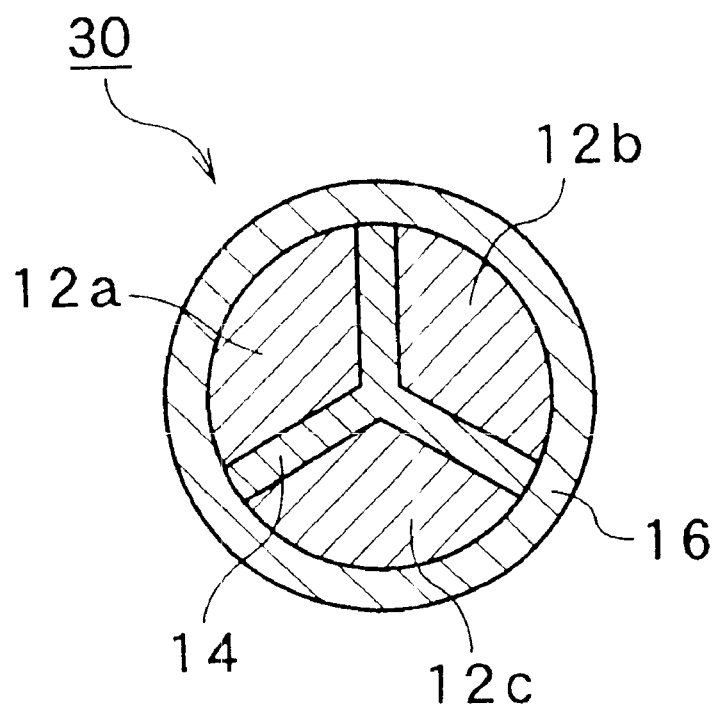
FIG. 7 is an enlarged cross-sectional view of the optical fiber used in the production of the optical component.
Figure 8A:
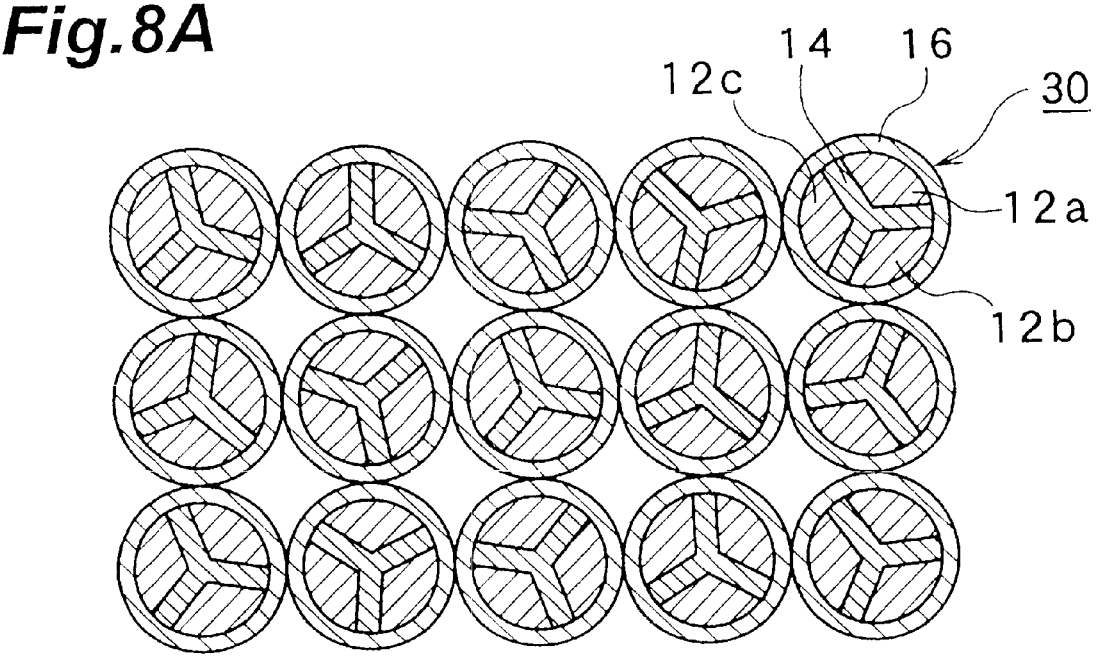
FIGS. 8A, 8B are production step diagrams for the optical component according to the embodiment of the present invention.
Figure 8B:
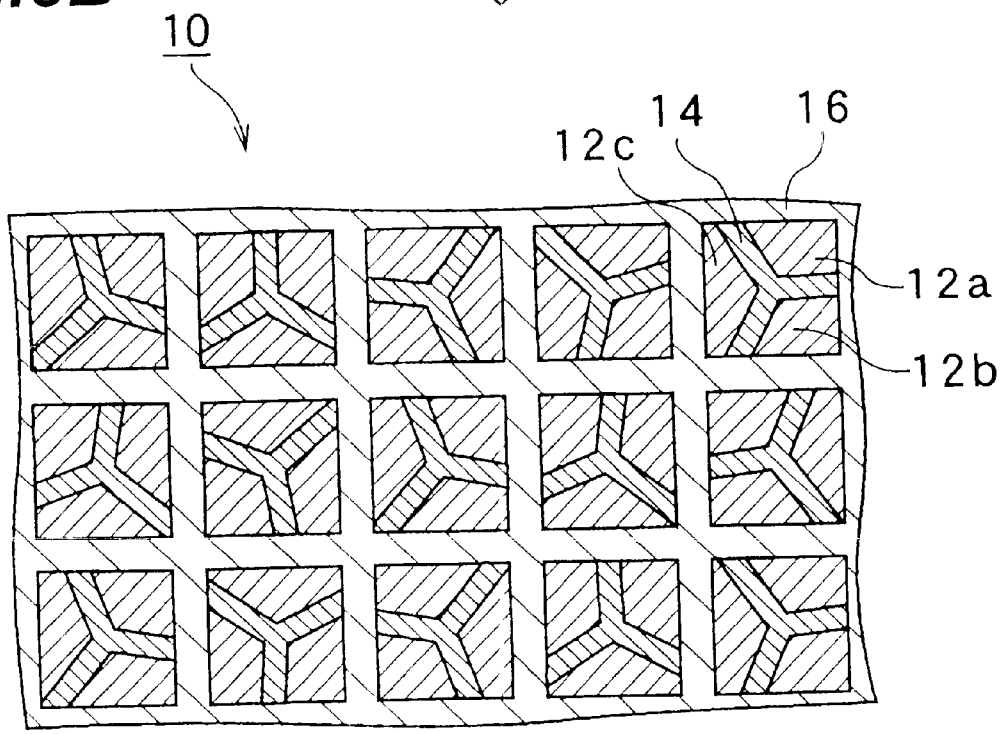

Furthermore, although the optical fibers 30 with the cores 12 equally divided in the two areas 12a and 12b via the clad parts 14 are arranged for the integral shaping in the above-mentioned embodiment, the integral shaping can be executed also with the optical fibers 30 with the cores 12 equally divided via the clad parts 14 into a plurality of, that is, three, four, or six areas arranged. By the integral shaping of the optical fibers 30 with the core 12 equally divided into the three areas 12a to 12c via the clad part 14 shown in FIG. 7 arranged in the quadrilateral dense arrangement as shown in FIG. 8A, the optical component 10 with each core 12 having a square cross-sectional shape as shown in FIG. 8B as well as divided equally into the three areas 12a to 12c can be provided, or by the integral shaping in the hexagonal dense arrangement as shown in FIG. 9A, the optical component 10 with each core 12 substantially having a hexagonal cross-sectional shape as shown in FIG. 9B as well as divided equally into the three areas 12a to 12c can be provided.

Figure 10:
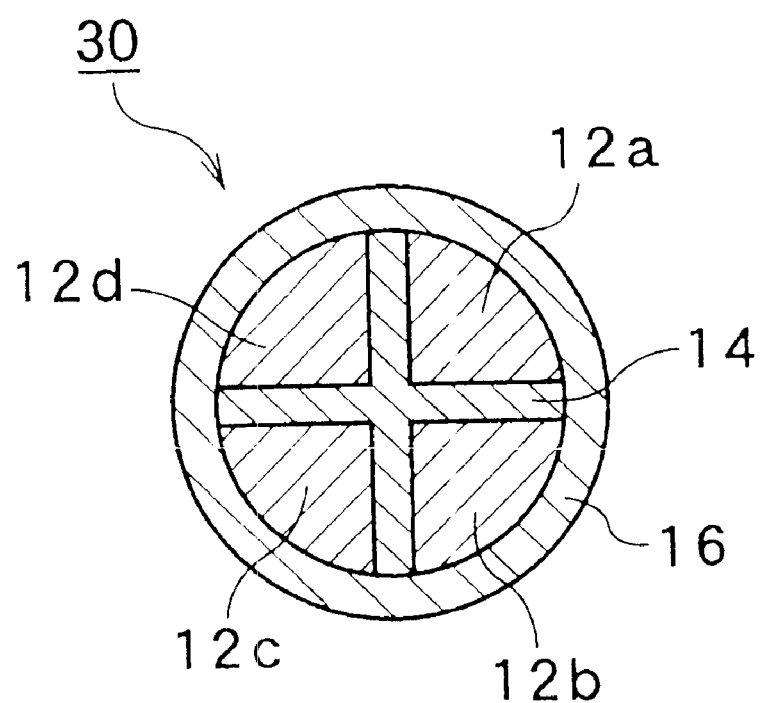
FIG. 10 is an enlarged cross-sectional view of the optical fiber used in the production of the optical component.
Figure 12A:
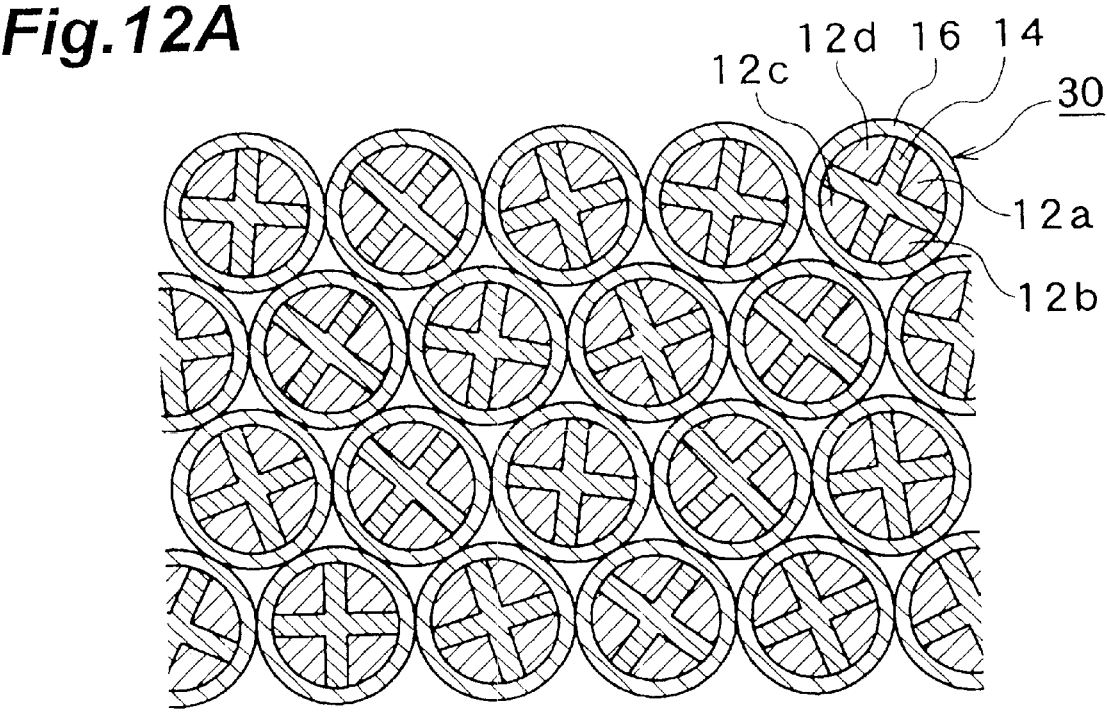
FIGS. 12A, 12B are production step diagrams for the optical component according to the embodiment of the present invention.
Figure 12B:
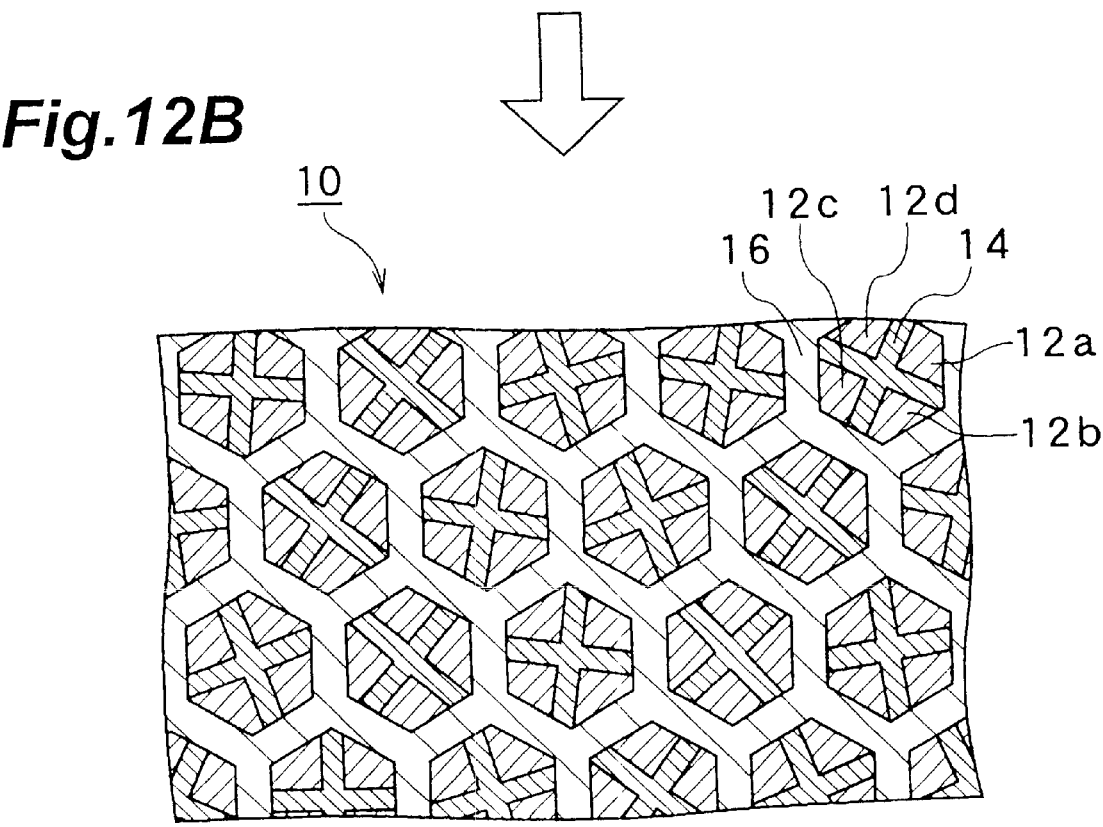

Moreover, by the integral shaping of the optical fibers 30 with the core 12 equally divided into the four areas 12a to 12d via the clad part 14 shown in FIG. 10 arranged in the quadrilateral dense arrangement as shown in FIG. 11A, the optical component 10 with each core 12 having a square cross-sectional shape as shown in FIG. 11B as well as divided equally into the four areas 12a to 12d can be provided, or by the integral shaping in the hexagonal dense arrangement as shown in FIG. 12A, the optical component 10 with each core 12 substantially having a hexagonal cross-sectional shape as shown in FIG. 12B as well as divided equally into the four areas 12a to 12d can be provided.

Figure 13:
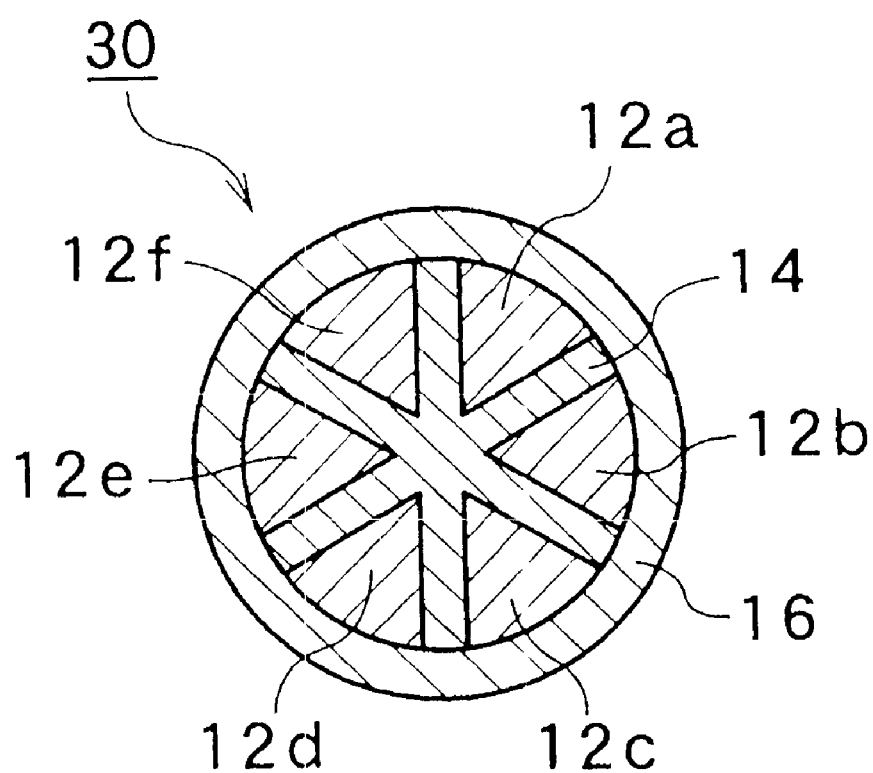
FIG. 13 is an enlarged cross-sectional view of the optical fiber used in the production of the optical component.
Figure 14A:
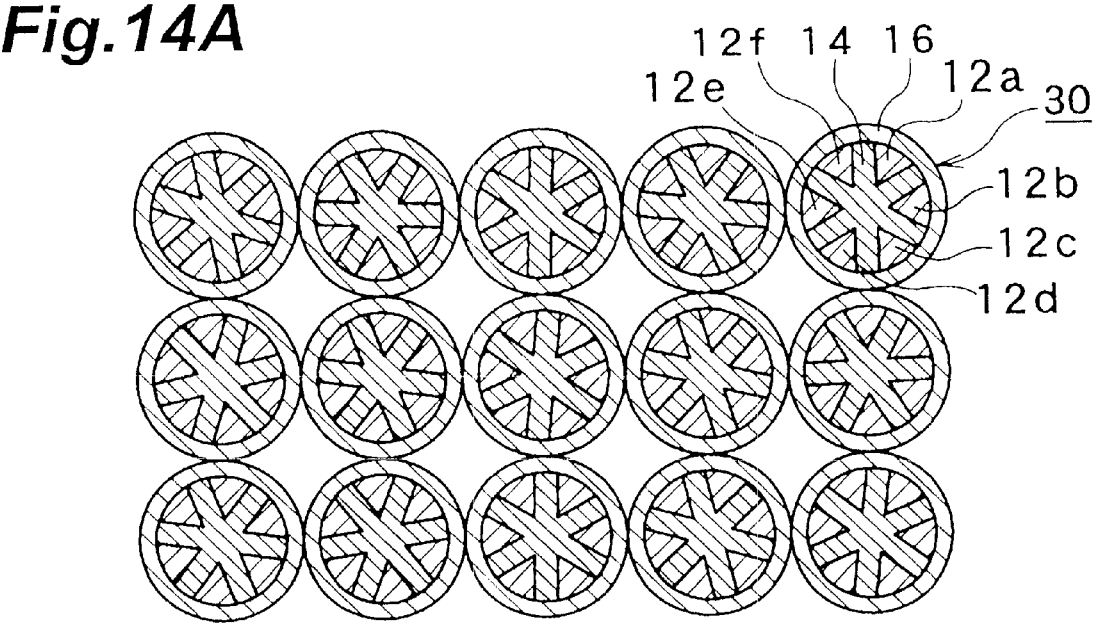
FIGS. 14A, 14B are production step diagrams for the optical component according to the embodiment of the present invention.
Figure 14B:
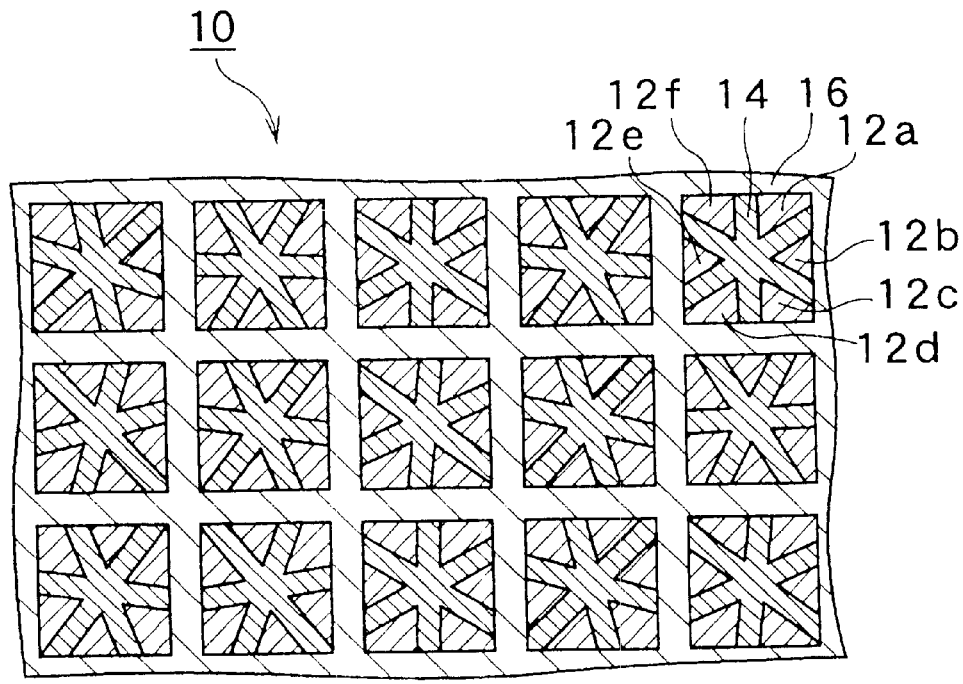

Furthermore, by the integral shaping of the optical fibers 30 with the core 12 equally divided into the six areas 12a to 12f via the clad part 14 shown in FIG. 13 arranged in the quadrilateral dense arrangement as shown in FIG. 14A, the optical component 10 with each core 12 having a square cross-sectional shape as shown in FIG. 14B as well as divided equally into the six areas 12a to 12f can be provided, or by the integral shaping in the hexagonal dense arrangement as shown in FIG. 15A, the optical component 10 with each core 12 substantially having a hexagonal cross-sectional shape as shown in FIG. 15B as well divided equally into the six areas 12a to 12f can be provided.

Figure 16:
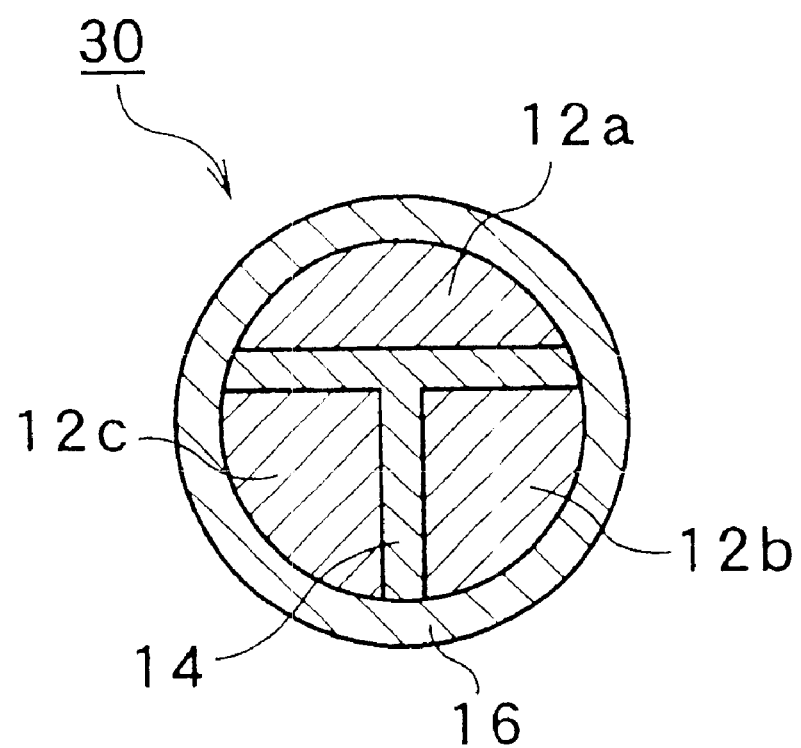
FIG. 16 is an enlarged cross-sectional view of the optical fiber used in the production of the optical component.

Moreover, although the core 12 is divided equally into a plurality of areas via the flat plate-like clad part 14 lying on the central axis of the core 12 in the above-mentioned embodiment, it is not limited to the division by the flat plate lying on the central axis, or the equal division into a plurality of areas. That is, for example, as shown in FIG. 16, the optical component 10 can be formed, using the optical fibers 30 with the cores 12 divided into a T-shape.

Furthermore, although the optical components 10 according to the above-mentioned embodiments are optical components with a plurality of optical fibers arranged parallel, they can be optical components having a tapered shape with a plurality of optical fibers having a curved part arranged for outputting an optical image incident on the incident surface with enlargement or reduction.

Since the above-mentioned optical components have various advantages such as a high transmission efficiency, and capability of downsizing of an optical system compared with a lens, they can be utilized in various areas such as a fingerprint detecting device, and a radiation detecting device.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical component comprising:
   a plurality of optical fibers, each optical fiber including a core unit and a clad formed around said core unit, said core unit having
      a substantially square cross-sectional shape;
      a plurality of cores; and
      a partition member made from a material with a refractive index smaller than a refractive index of said plurality of cores, for dividing said core unit into said plural cores in a longitudinal direction of said core unit by being inserted between said plural cores, at least one of said core units having a dividing direction in said plural cores different from a dividing direction of said core unit which is adjacent to said at least one of said core units.

2. The optical component according to claim 1, wherein said core unit of each optical fiber is divided substantially equally into a plurality of areas by said partition member having a flat plate-like shape and lying on a central axis of said core unit.

3. An optical component comprising:
   a plurality of optical fibers, each optical fiber including a core unit and a clad formed around said core unit, said core unit having
      a substantially hexagonal cross-sectional shape;
      a plurality of cores; and
      a partition member made from a material with a refractive index smaller than a refractive index of said plurality of cores, for dividing said core unit into said plural cores in a longitudinal direction of said core unit by being inserted between said plural cores, at least one of said core units having a dividing direction in said plural cores different from a dividing direction of said core unit which is adjacent to said at least one of said core units.

4. The optical component according to claim 3, wherein said core unit of each optical fiber is divided substantially equally into a plurality of areas by said partition member having a flat plate-like shape and lying on a central axis of said core unit.

5. A method of manufacturing an optical component comprising the steps of:
   arranging a plurality of optical fibers each including a core unit and a clad formed around said core unit,
      said core unit comprising a plurality of cores and a partition member made from a material with a refractive index smaller than a refractive index of said plurality of cores, for dividing said core unit into said plural cores in a longitudinal direction of said core unit by being inserted between said plural cores,
      at least one of said core units having a dividing direction in said plural cores different from a dividing direction of said core unit which is adjacent to said at least one of said core units; and
   integrally shaping said plurality of said optical fibers arranged in the arrangement step by a heating and pressuring treatment,
   wherein a viscosity of said core under the temperature of the heating and pressuring treatment is smaller than a viscosity of the clad in the shaping step.

* * * * *